United States Patent
Yang et al.

(10) Patent No.: US 9,003,909 B2
(45) Date of Patent: Apr. 14, 2015

(54) RACK BAR SUPPORTING DEVICE OF VEHICLE STEERING APPARATUS

(75) Inventors: Kwang Ho Yang, Seoul (KR); Kyoung Min Kim, Gyeongju-si (KR)

(73) Assignee: Mando Corporation, Pyeongtaek-Si (KR)

( * ) Notice: Subject to any disclaimer, the term of this patent is extended or adjusted under 35 U.S.C. 154(b) by 277 days.

(21) Appl. No.: 13/524,461

(22) Filed: Jun. 15, 2012

(65) Prior Publication Data

US 2012/0318086 A1    Dec. 20, 2012

(30) Foreign Application Priority Data

Jun. 20, 2011    (KR) .................. 10-2011-0059529

(51) Int. Cl.
*B62D 5/04* (2006.01)
*F16H 55/28* (2006.01)
*B62D 3/12* (2006.01)

(52) U.S. Cl.
CPC ........... *B62D 3/123* (2013.01); *Y10T 74/19623* (2015.01); *F16H 55/283* (2013.01)

(58) Field of Classification Search
USPC ............... 74/409, 422, 89.17, 388 PS, 606 R; 280/93.515, 93.514, 779; 180/400, 180/444, 426, 427, 428
See application file for complete search history.

(56) References Cited

U.S. PATENT DOCUMENTS

| | | | | |
|---|---|---|---|---|
| 4,449,601 A | * | 5/1984 | Adams | 180/428 |
| 4,724,717 A | * | 2/1988 | Chikuma | 74/498 |
| 5,058,448 A | * | 10/1991 | Kiyooka et al. | 74/422 |
| 5,511,630 A | * | 4/1996 | Kohata et al. | 180/422 |
| 6,142,031 A | * | 11/2000 | Phillips | 74/422 |
| 6,799,655 B2 | * | 10/2004 | Hama et al. | 180/444 |
| 6,921,096 B2 | * | 7/2005 | Yang | 280/93.514 |
| 7,325,646 B2 | * | 2/2008 | Asada | 180/444 |
| 7,815,204 B2 | * | 10/2010 | Kaida et al. | 280/93.514 |
| 7,926,376 B2 | * | 4/2011 | Hirose et al. | 74/409 |
| 8,327,731 B2 | * | 12/2012 | Sung et al. | 74/422 |
| 8,708,357 B2 | * | 4/2014 | Sumihara | 280/93.514 |
| 2002/0124670 A1 | * | 9/2002 | Bugosh | 74/388 PS |
| 2002/0152825 A1 | * | 10/2002 | Adams et al. | 74/422 |
| 2007/0209463 A1 | * | 9/2007 | Song et al. | 74/388 PS |

FOREIGN PATENT DOCUMENTS

| | | |
|---|---|---|
| CN | 101032977 A | 9/2007 |
| JP | 2002-321630 A | 11/2002 |

* cited by examiner

*Primary Examiner* — William C Joyce
*Assistant Examiner* — Jude Agendia
(74) *Attorney, Agent, or Firm* — McDermott Will & Emery LLP

(57) ABSTRACT

A rack bar supporting device for a vehicle steering apparatus, having a clearance between the rack bar and a support yoke can be kept always constant when the vehicle steering apparatus is operated, which makes it possible to reduce operational friction and noise, to maintain the supporting force of the support yoke and the rack bar to be constant for a long time, and to improve a steering feeling of a driver.

7 Claims, 5 Drawing Sheets

RACK BAR SUPPORTING DEVICE OF VEHICLE STEERING APPARATUS

BACKGROUND OF THE INVENTION

1. Field of the Invention

The present invention relates to a rack bar supporting device of a vehicle steering apparatus. More particularly, the present invention relates to a rack bar supporting device of a rack-and-pinion type steering apparatus of a vehicle, which is configured to be capable of keeping a clearance between a rack bar and a support yoke always constant when the vehicle steering apparatus is operated, so that operational friction and noise can be reduced, the supporting force of the support yoke and the rack bar can be kept constant for a long time, and the driver's steering feeling can be improved.

2. Description of the Prior Art

As generally known in the art, a steering apparatus of a vehicle means an apparatus that allows a driver to change a driving direction of the vehicle by his/her will. The steering apparatus helps the driver to optionally change the center of rotation, about which the vehicle's front wheels are turned, so as to make the vehicle move in a direction desired by the driver.

FIG. 1 is a schematic view of a conventional rack-and-pinion type steering apparatus.

As illustrated, the conventional rack-and-pinion type steering apparatus includes: a steering wheel 100 arranged at a driver's seat side; a steering shaft 105 connected to the steering wheel 100; a steering column 103 configured to allow the steering shaft 100 to be fixed to a vehicle body; a gear box 130 provided with a rack gear 110 and a pinion gear 120 to convert a turning force input from the steering shaft 105 into a rectilinear movement; a rack bar 140 provided with an inner ball joint 135 at each end thereof; a rack housing 170 assembled with the rack bar 140; and a tie rod 150 integrally formed with a ball of the inner ball joint 135.

The tie rod 150 is connected with an outer ball joint 155 and transmits a force to a knuckle 159 to steer tires 158.

FIG. 2 is a cross-sectional view of a conventional rack bar supporting device.

As illustrated, the conventional rack bar supporting device includes a pinion gear 120, a rack bar 140, a support yoke 260, an elastic support 263, and a yoke plug 265. As described above, the rack-and-pinion type gear box 130 is adapted to convert a turning force input from a steering shaft (not shown) into a rectilinear movement.

The rack bar 140 is engaged with the pinion gear 120 to convert a turning movement into a rectilinear movement, in which a device for supporting the rack bar 140 in relation to the pinion gear 120 side is provided behind the rack bar 140 so as to facilitate the engagement between the rack bar 140 and the pinion gear 120.

The device for supporting the rack bar 140 includes a support yoke 260, an elastic support 263, and a yoke plug 265, in which the support yoke 260 is positioned opposite to the rear side of the rack bar 140, on which the rack gear 110 (see FIG. 1) is formed, and is inserted into a cylinder 250 of the gear box 130 to be movable forward and backward perpendicularly to the rack bar 140.

The support yoke 260 is formed in a cylindrical shape so that it can be slid forward and backward, and on the front side thereof where the support yoke 260 is in contact with the rack bar 140, the support yoke 260 is formed with a groove of a semicircular cross-section, so that the front side of the support yoke 260 can be in close contact with the rear side of the rack bar 140.

In addition, in order to assure that the rack bar 140 and the pinion gear 120 can be in close contact with each other to efficiently transmit a force, the elastic support 263 is arranged behind the support yoke 260 to push the support yoke 260 with a predetermined pressure so as to compensate for a clearance produced between the rack bar 140 and the pinion gear 120.

The support yoke 260 is caused to be frictionally slid against the rear side of the rack bar 140. In order to prevent the rack bar 140 from being worn or producing a noise due to friction, the support yoke 260 formed of a plastic material softer than the rack bar 140 may be occasionally used.

The elastic support 263 received in an elastic support groove 220 serves to apply pressure so that the support yoke 260 comes into close contact with the rack bar 140. Typically, a coil spring is employed as the elastic support 263, and the yoke plug 265 is positioned behind the elastic support 263 to support the elastic support 263.

The yoke plug 265 supports the elastic support 263, so that the elastic support 263 can apply pressure to the support yoke 260. Since the yoke plug 265 is typically formed with peaks and valleys of threads so that the yoke plug 265 can be fixedly engaged with the gear box 130 and a lock nut 240, which are formed with peaks and valleys of threads corresponding to those of the yoke plug 265. In addition, a tool groove 230 is formed on the rear side of the yoke plug 265, in which a wrench may be inserted into the tool groove 230.

However, such a conventional rack bar supporting device has problems in that since the support yoke may be greatly worn, operational friction and noise are increased, and a large clearance is produced due to the increased wear of the support yoke, thereby reducing the supporting force of the rack bar, and deteriorating the driver's steering feeling.

SUMMARY OF THE INVENTION

Accordingly, the present invention has been made to solve the above-mentioned problems occurring in the prior art, and an aspect of the present invention is to provide a rack bar supporting device of a vehicle steering apparatus which is configured to be capable of keeping a clearance between a rack bar and a support yoke always constant when the vehicle steering apparatus is operated, which makes it possible to reduce operational friction and noise, to keep the supporting force of the support yoke and the rack bar constant for a long time, and to improve the steering feeling of a driver.

In accordance with an aspect of the present invention, there is provided a rack bar supporting device for a vehicle steering apparatus, including: one or more yoke seats configured to support the rear side of the rack bar; a support yoke formed with one or more mounting grooves on the front side thereof, the yoke seats being fitted in the mounting grooves, respectively; one or more elastic supports fitted in the mounting grooves to bias the yoke seats toward the center of the support yoke; and a yoke plug configured to support the rear side of the support yoke against the rack bar with the help of an elastic member, the yoke plug being coupled to a cylinder of a gear box.

According to the present invention, it is possible to keep the clearance between the rack bar and the support yoke always constant when the vehicle steering apparatus is operated, which makes it possible to reduce operational friction and noise, to keep the supporting force of the support yoke and the rack bar constant for a long time, and to improve the steering feeling of a driver.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
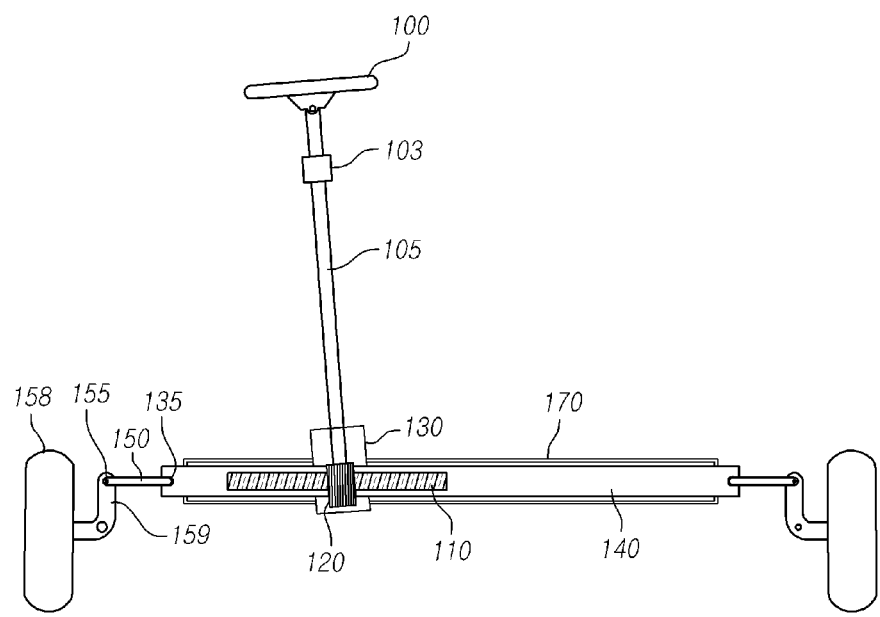
FIG. 1 is a schematic view of a conventional vehicle steering apparatus.
Figure 2:
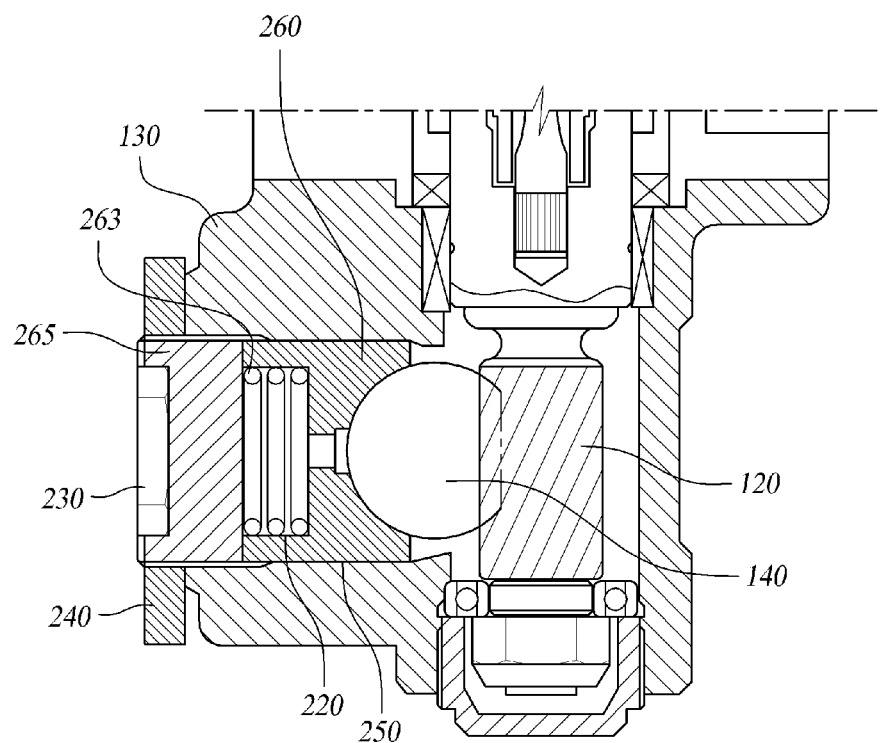
FIG. 2 is a cross-sectional view of a conventional rack bar supporting device.

Hereinafter, exemplary embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, a third component may be "connected," "coupled," and "joined" between the first and second components, although the first component may be directly connected, coupled or joined to the second component.

In the detailed description of the present invention, for the convenience of description, it is assumed that the pinion gear side on the drawings (the left parts of the drawings) is designated as the front side, and the opposite side, i.e. the yoke plug side (right side on the drawings) is designated as the rear side unless specifically defined.

Figure 3:
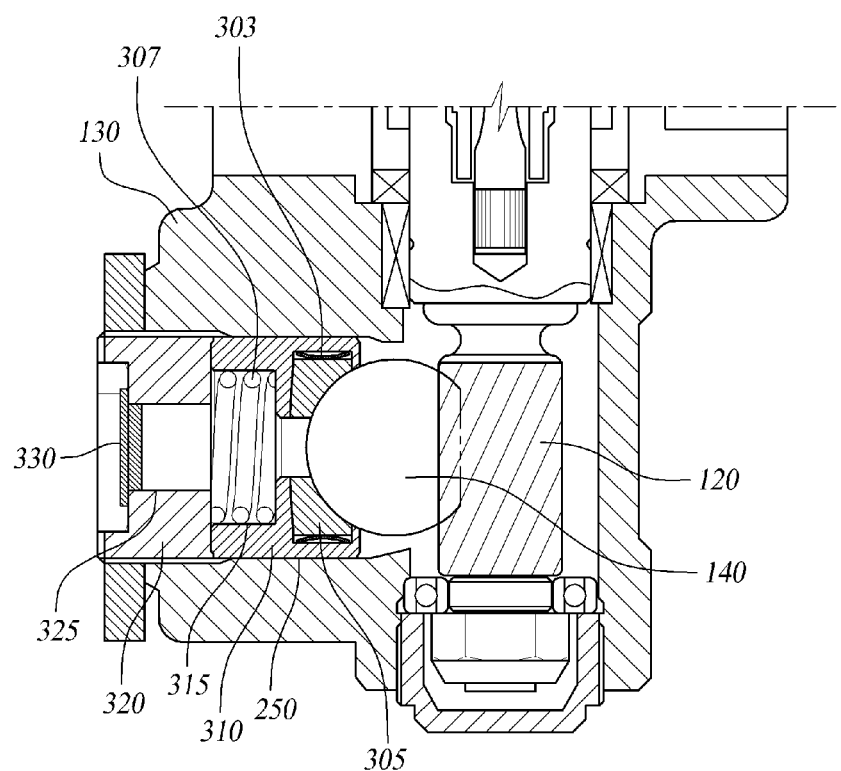
FIG. 3 is a cross-sectional view of a rack bar supporting device of a vehicle steering apparatus in accordance with an exemplary embodiment of the present invention.
Figure 4:
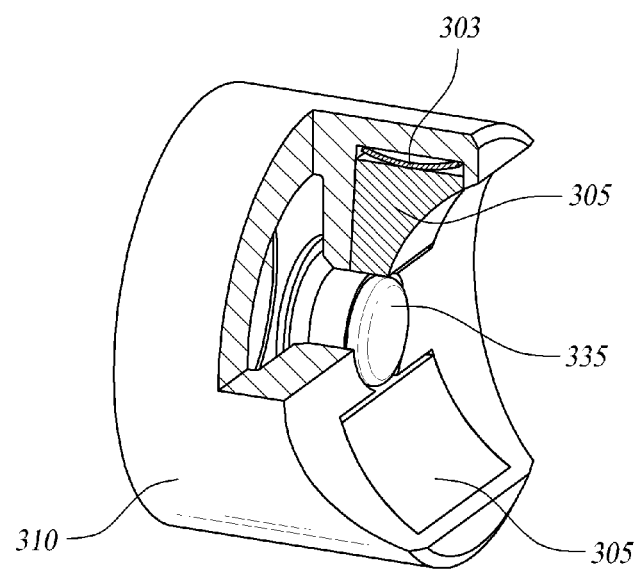
FIG. 4 is a perspective view illustrating a support yoke in accordance with an exemplary embodiment of the present invention partially in cross-section.
Figure 5:
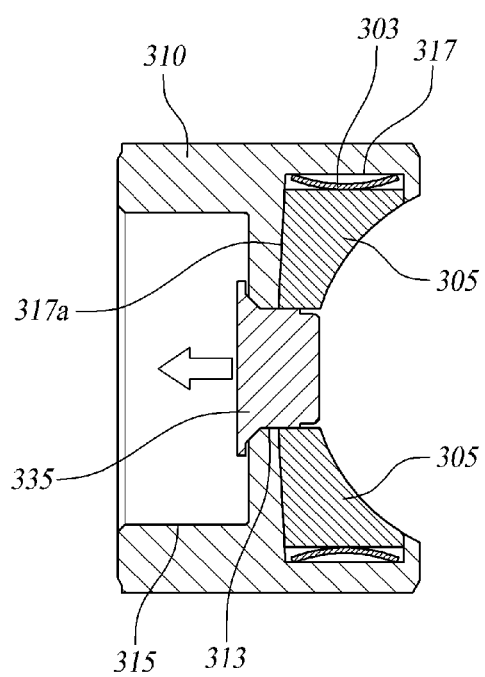
FIG. 5 is a cross-sectional view illustrating the support yoke in accordance with the exemplary embodiment of the present invention.

FIG. 3 is a cross-sectional view of a rack bar supporting device of a vehicle steering apparatus in accordance with an exemplary embodiment of the present invention, FIG. 4 is a perspective view illustrating a support yoke in accordance with an exemplary embodiment of the present invention partially in cross-section, and FIG. 5 is a cross-sectional view illustrating the support yoke in accordance with the exemplary embodiment of the present invention.

As illustrated, the rack bar supporting device of a vehicle steering apparatus in accordance with an exemplary embodiment of the present invention includes: one or more wedge-shaped yoke seats 305 configured to support the rear side of the rack bar 140, and each of the yoke seats 305 having a concave front side; a support yoke 310 formed with one or more mounting grooves 317 on the front side thereof, the yoke seats 305 being fitted in the mounting grooves 317, respectively; one or more elastic supports 303 configured to be fitted in the mounting grooves 317 respectively to bias the yoke seats 305 toward the center of the support yoke 310; and a yoke plug 320 configured to support the rear side of the support yoke 310 against the rack bar 140 through an elastic member 307, the yoke plug 320 being coupled to a cylinder 250 of a gear box 130.

The support yoke 310 is inserted into the cylinder 250 of the gear box 130 such that the front side of the support yoke 310 comes into close contact with the rear side of the rack bar 140 meshed with a pinion gear 120 to support the rack bar 140 forward so that the rack bar 140 and the pinion gear 120 can be properly meshed with each other.

The concave wedge-shaped yoke seats 305 are fitted in the mounting grooves 317, respectively, which are formed in the front side of the support yoke 310, in which the yoke seats 305 are adapted to be capable of being moved diametrically.

With the help of the elastic member 307 interposed between the support yoke 310 and the yoke plug 320, the support yoke 310 pushes the rack bar 140 forward to make the rack bar 140 and the pinion gear 120 come into close contact with each other to transmit force efficiently, and to make the rack bar 140, the support yoke 310 and the pinion gear 120 keep a constant clearance to compensate for the clearance.

The yoke seats 305 are fitted in the mounting grooves 317 of the support yoke 310 respectively to support the rear side of the rack bar 140. Each of the yoke seats 305 is formed in a wedge shape with an arc-shaped cross-section such that the front side of each of the yoke seats 305 is formed in a concavely curved surface which is complementary with the shape of the rear side of the rack bar 140.

The yoke seats 305 may be worn due to friction by being contacted with the rack bar 140 when the rack bar 140 is linearly moved, which causes a clearance to be produced between the yoke seats 305 and the rack bar 140. In order to compensate for the clearance, the elastic supports 303 are fitted in the mounting grooves 317 of the support yoke 310, respectively.

That is, when the wedge shaped yoke seats 305 are fitted in the mounting grooves 317, respectively, the elastic supports 303, such as leaf springs, Belleville springs or coil springs, are interposed between the outer circumference side parts of the yoke seats 305 and the outer circumference side walls of the mounting grooves 317 to bias the yoke seats 305 toward the center of the support yoke 310, in which the front side of each of the yoke seats 305 is formed to have a curvature corresponding to that of the rear side of the rack bar 140.

The mounting grooves 317 are formed in the upper and lower half parts of the front side of the support yoke 310 to be symmetric to each other with reference to the center of the support yoke 310, and the yoke seats 305 are fitted in the mounting grooves 317, respectively, to support the rear side of the rack bar 140. The rear side of each of the yoke seats 305 is supported by and engaged with a seating surface 317a, which is formed as an inclined surface, the height of which is gradually increased toward the rack bar 140 as approaching to the outer circumference side from the center of the support yoke 310.

Therefore, the yoke seats 305 are adapted to be moved to the center of the support yoke 310 along the seating surfaces 317a by the elastic force of the elastic supports 303, respectively, and even when a load reversely input from a road surface while the vehicle is being driven is transmitted to the yoke seats 305 through the rack bar 140, each of the yoke seats 305 is pushed to the outer circumference side of the support yoke 310 to prevent the increase of the clearance.

The yoke seats 305 may be formed from a steel material which is excellent in wear resistance and low-friction property. In some cases, the yoke seats 305 may be formed from an engineering plastic class material, such as polyacetal (POM), polyamide (PA), polycarbonate (PC), polyimide (PI), or polybutylene terephthalate (PBT).

For the convenience of correct position setting and assembly when assembling the support yoke 310 and the yoke seats 305, an adjustment hole 313 is axially formed at the center of the support yoke 310, and an adjustment member 335 configured to set the diametrical position of the yoke seats 305 when assembling the support yoke 310 is inserted into the adjustment hole 313.

That is, upon being inserted into the adjustment hole 313, the adjustment member 335 pushes the yoke seats 305 toward the outer circumference sides thereof such that the elastic members 307 are compressed and assembled, and after assembly, the adjustment member 335 is removed to enable the elastic members 305 to exert elastic force such that the yoke seats 305 can support the rack bar 140 without a clearance between the yoke seat 305 and the rack bar 140.

As the wedge-shaped yoke seats 305 lose durability to a certain degree and a clearance between the yoke seats 305 and the rack bar 140 due to the wear of the yoke seats 305, the yoke seats 305 are moved toward the center of the support yoke 310 along the seating surfaces 317a by the elastic force of the elastic supports 303, and the concave front surfaces of the yoke seats 305 come into close contact with the rear side of the rack bar 140, thereby compensating for the clearance between the yoke seats 305 and the rack bar 140.

In addition, a hollow part 315 communicating with the adjustment hole 313 is provided on the rear side of the support yoke 310, and a communication hole 325 communicating with the hollow part 315 of the support yoke 310 is also provided in the yoke plug 320, so that the adjustment member 335 can be easily removed after the support yoke 310 and the yoke plug 320 are assembled to each other.

The yoke plug 320 is screw-coupled to the cylinder 250 of the gear box 130, in which the yoke plug 320 supports the rear side of the support yoke 310 and pushes the rack bar 140 and the support yoke 310 forward with the help of the elastic member 307, so that a predetermined clearance between the rack bar 140 and the pinion gear 120 can be maintained.

The elastic member 307 is supported by the yoke plug 320 fixedly inserted into the hollow part 315 of the support yoke 310, and pushes the support yoke 310 toward the rack bar 140. A cap 330 for preventing foreign matter from being introduced from the outside may be coupled to the communication hole 325 of the yoke plug 320.

According to the present invention constructed and shaped as described above, it is possible to keep the clearance between the rack bar 104 and the support yoke 310 always constant when the steering apparatus of the vehicle is operated, which makes it possible to reduce the operational friction and noise, to keep the supporting force of the support yoke and the rack bar constant for a long time, and to improve a steering feeling of a driver.

Even if it was described above that all of the components of an embodiment of the present invention are coupled as a single unit or coupled to be operated as a single unit, the present invention is not necessarily limited to such an embodiment. That is, among the components, one or more components may be selectively coupled to be operated as one or more units.

In addition, since terms, such as "including," "comprising," and "having" mean that one or more corresponding components may exist unless they are specifically described to the contrary, it shall be construed that one or more other components can be included. All of the terminologies containing one or more technical or scientific terminologies have the same meanings that persons skilled in the art understand ordinarily unless they are not defined otherwise. A term ordinarily used like that defined by a dictionary shall be construed that it has a meaning equal to that in the context of a related description, and shall not be construed in an ideal or excessively formal meaning unless it is clearly defined in the present specification.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A rack bar supporting device for a vehicle steering apparatus, comprising:
    one or more yoke seats configured to support a rear side of a rack bar;
    a support yoke formed with one or more mounting grooves on a front side thereof, the yoke seats being fitted in the mounting grooves, respectively;
    one or more elastic supports fitted in the mounting grooves to bias the yoke seats toward a center of the support yoke; and
    a yoke plug configured to support a rear side of the support yoke against the rack bar with the help of an elastic member, the yoke plug being coupled to a cylinder of a gear box,
    an adjustment hole formed at the center of the support yoke; and
    an adjustment member disposed inside the adjustment hole, and directly contacting the rack bar,
    wherein the support yoke is provided with a hollow part communicating with the adjustment hole on the rear side of the support yoke, such that the adjustment member can be removed after the support yoke and the yoke plug are assembled to each other.

2. The rack bar supporting device as claimed in claim 1, wherein the mounting grooves are formed in the opposite parts of the front side of the support yoke, respectively, and the yoke seats are fitted in the opposite mounting grooves, respectively.

3. The rack bar supporting device as claimed in claim 2, wherein each of the mounting grooves is formed with a seating surface, against which a rear side of one of the yoke seats is abutted, the seating surface being formed in an inclined surface, the height of which is gradually increased toward the rack bar as approaching to the outer circumference side from the center of the support yoke.

4. The rack bar supporting device as claimed in claim 1, wherein the adjustment member being configured to set a diametrical position of the yoke seats when assembling the support yoke.

5. The rack bar supporting device as claimed in claim 1, wherein the yoke plug is provided with a communication hole communicating with the hollow part of the support yoke, so that the adjustment member can be removed after the yoke plug is assembled to the cylinder of the gear box.

6. The rack bar supporting device as claimed in claim 5, wherein a cap is coupled to the communication hole of the yoke plug to prevent foreign matter from being introduced into the communication hole.

7. The rack bar supporting device as claimed in claim 5, wherein the communication hole has a larger diameter than that of the adjustment hole, through which the adjustment member can be removed.

\* \* \* \* \*